US010771547B2

(12) United States Patent
Miyaki

(10) Patent No.: US 10,771,547 B2
(45) Date of Patent: Sep. 8, 2020

(54) ONLINE MATCHMAKING FOR P2P TOPOLOGIES

(71) Applicant: Sony Interactive Entertainment America LLC, San Mateo, CA (US)

(72) Inventor: Ken Miyaki, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 311 days.

(21) Appl. No.: 15/623,327

(22) Filed: Jun. 14, 2017

(65) Prior Publication Data

US 2018/0367608 A1 Dec. 20, 2018

(51) Int. Cl.
  *G06F 15/16* (2006.01)
  *H04L 29/08* (2006.01)
(52) U.S. Cl.
  CPC ........ *H04L 67/1061* (2013.01); *H04L 67/141* (2013.01); *H04L 67/18* (2013.01)
(58) Field of Classification Search
  CPC ......... H05L 51/10; H04L 51/12; H04L 63/08; H04L 63/10
  See application file for complete search history.

(56) References Cited

U.S. PATENT DOCUMENTS

| 8,060,626 | B2 | 11/2011 | Roy et al. |
| 8,224,985 | B2 | 7/2012 | Takeda |
| 8,831,968 | B2 | 9/2014 | Zalewski |
| 8,998,723 | B2 | 4/2015 | Buhr |
| 2009/0209349 | A1 | 8/2009 | Padhye et al. |
| 2010/0030567 | A1 | 2/2010 | Zalewski |
| 2013/0227019 | A1* | 8/2013 | Vyrros ................... H04L 29/125 709/204 |
| 2016/0080236 | A1* | 3/2016 | Nikolaev ................ H04L 63/14 709/224 |
| 2017/0149882 | A1* | 5/2017 | Roy ..................... H04L 67/1065 |

OTHER PUBLICATIONS

International Search Report and Written Opinion dated Aug. 30, 2018 for International Patent Application No. PCT/US2018/037020.

* cited by examiner

*Primary Examiner* — Yves Dalencourt
(74) *Attorney, Agent, or Firm* — JDI Patent; Joshua D. Isenberg; Robert Pullman

(57) ABSTRACT

For improved peer to peer matchmaking network information is obtained from a plurality of devices and a plurality of users is selected to form peer to peer connections via corresponding devices to create a set of potential matches. Device connection statistics for each pair of devices in the set of potential matches are obtained and compared to one or more threshold values. Users with devices that have at least one connection statistic that does not satisfy a threshold condition for that connection statistic are removed from the set of potential matches. Replacements for the removed devices are selected and the match making refinement process repeated until all of the device connection statistics satisfy all conditions associated with the one or more threshold values to generate a refined set of matched peers. Peer to peer connections may then be initiated among the refined set of matched peers.

30 Claims, 6 Drawing Sheets

ONLINE MATCHMAKING FOR P2P TOPOLOGIES

FIELD OF THE INVENTION

The present disclosure relates to matchmaking in a networked environment. More specifically the present disclosure relates to peer selection and matchmaking in a peer to peer network.

BACKGROUND OF THE INVENTION

In modern simulated environments a user may connect with other users in numerous different ways depending on the connection architecture of the environment. The most common connection architectures in modern simulations are the server-client model and the peer to peer model.

Both of the models have their respective benefits and drawbacks. The server-client model requires special infrastructure to allow user connections. This infrastructure requires constant upkeep and is costly to develop and maintain. The peer to peer model presents an alternative to the server-client model. The peer to peer model does not require the additional costly infrastructure of the server client-model to allow user connections although some infrastructure may be needed to initially create the connections. Unlike the server-client model the peer to peer model is limited to deterministic simulation because each peer is synchronized individually with no master controlling the overall behavior of the simulation on each client. The peer to peer model also presents difficulty in connecting and maintaining connections between peers. Particularly problematic for the peer to peer model is the process by which peers connect to each other, referred to as Network Address Translation (NAT) punch through.

NAT is an Internet standard that enables a local area network (LAN) to use of one set of private IP addresses for internal traffic and a second set of global IP addresses for external traffic. A node that has NAT capability is often referred as "NAT box." Though IPv6 has introduced a larger global IP address set for connection to the internet the amount of users connecting to the internet through IPv4 and NAT-enabled routers continues remain high with some internet providers even creating networks where more than one NAT must be traversed to access the global internet.

A NAT (literally) translates network (IP) address between the two networks. Network Address Port Translation (NAPT) translates not only IP address but also port numbers of a transport layer protocol. Although NAT/NAPT has its good properties, there is a significant side effect. If the translation is dynamically performed, nodes in the external network have no way to know the IP address (and the port number) on the NAT ahead of time to reach a node in the internal network. Unfortunately, this is the most common behavior of NAT in the residential and SOHO routers deployed in the current market.

NAPT (hereinafter, called "NAT" unless stated otherwise) is the most common NAT in today's residential routers. In a NAT, an IP address is used to identify an end node, or a host. There may be more than one application running on the same node. Typically, each application has a unique port number allocated to the same IP address. That is, in order to identify an application, both an IP address and a port number must be specified.

The notion of "port" is important to understand NAT behavior. A NAT allows two or more IP nodes behind the NAT to share a single global IP address, by translating the port numbers. When an application on a node sends a packet to a server on the public network, the NAT allocates a public transport address, having an external IP address and an external port number that is associated with the source transport address. This association created by NAT is known as "NAT Binding". When another application on a different node behind the NAT sends a packet to the same server the NAT creates another binding with the same external IP address but with another port number. For the server, those packets look like they originated from the same node but from different port numbers. The server then simply sends responses back to those external transport addresses on the NAT. Since the NAT already has bindings for packets received from the server these packets can be correctly forwarded to the associated local nodes. A problem occurs when a node behind the NAT wants to be accessed from anyone from the public network. A NAT binding cannot be created by packets from the pubic network. The NAT can forward the inbound packets only if an associated binding already exists.

To address this problem, many routers have a Port Forwarding feature which allows a user to manually configure the routing table in the router. As opposed to NAT binding, a specified external transport address on the NAT is static so that any inbound packets arrived on the external transport address are forwarded to the specified local node on the private network. Unfortunately, such manual configuration requires users to have sufficient knowledge of TCP/IP protocol and NAT. Users also need to know the transport addresses of the applications running on the local nodes to configure the port forwarding tables. Since port forwarding is not a standardized feature, each router has a different configuration menu some of which might not be able to meet requirements from an application. To application vendors, the cost for customer support for those users who are experiencing trouble with configuration for various NATs would be very significant.

It has been observed that NAT treatment of User Datagram Protocol (UDP) varies among implementations. Four treatments commonly observed in implementations are, Full Cone, Restricted Cone, Port Restricted Cone and Symmetric. A full cone NAT is one where all requests from the same internal IP address and port are mapped to the same external IP address and port. Furthermore, any external host can send a packet to the internal host, by sending a packet to the mapped external address. In a restricted cone NAT all requests from the same internal IP address and port are mapped to the same external IP address and port. Unlike a full cone NAT, an external host (with IP address X) can send a packet to the internal host only if the internal host had previously sent a packet to IP address X. A port restricted cone NAT is like a restricted cone NAT, but the restriction includes port numbers. Specifically, an external host can send a packet, with source IP address X and source port P, to the internal host only if the internal host had previously sent a packet to IP address X and port P.

In a symmetric NAT all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a UDP packet back to the internal host.

Similar to a restricted cone NAT a stateful firewall limits the packets allowed to be sent to the host to addresses that the host has already sent to. This firewall type can present difficulty in peer to peer connections similar to those presented by a NAT.

One prior art NAT traversal solution has been developed based on UPnP (Universal Plug and Play), a technical specification that enables communications among home appliances such as PC, Audio/Video devices, phones and etc., proposed by Microsoft in 1999 and supported by more than 20 companies including Intel, 3Com, AT&T, Dell Computer, etc. UPnP provides NAT traversal solution that allows a node behind a UPnP compliant NAT to discover the presence of the NAT and to add and delete external port mapping on the NAT. It is an automatic port forwarding configuration, so to speak. Many residential routers support UPnP today, however, not all of them do. Some UPnP compliant routers have UPnP mode turned off by default. Users may be prompted to turn on the UPnP mode manually, but this essentially falls into the same issue with the port forwarding.

A major problem with NAT traversal in the current peer to peer networking environment is that there is no standardized NAT behavior common to all types of routers and user side solutions for NAT traversal have been developed but have not been implemented completely. Features such as UPnP and Port Forwarding are available on some but not all consumer grade routers. These features can enhance connectivity between peers making connections easier and more reliable.

Generally matchmaking over a network peers are chosen based on easily collected information about the user such as win rate, user rank, download rating, community rating etc. A difficulty specific to peer to peer network matchmaking is that a user may not be able to use the network or the desired network application until all of the peers have connected with each other. Peer to Peer networks are especially susceptible to users with bad network connections because if one peer takes particularly long to join the match all of the other peers must wait until that peer has joined before being allowed to use the application and if one user drops from the application allowing another user to join while the network is established may be very complex or not possible. Thus there is a need in the art for a way for matchmaking to account for NAT and firewall differences between peers during peer selection to enhance the user experience and provide better connectivity.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Peer to peer networks are common connection architectures for simulated environments such as video games. These peer to peer networks allow users to connect to each other without connecting to a common server forming what is referred to as a peer grid. To form these connections the peer devices may connect to a match making server. The match making server chooses peer devices to match and facilitates the connections between the peers.

Figure 1:
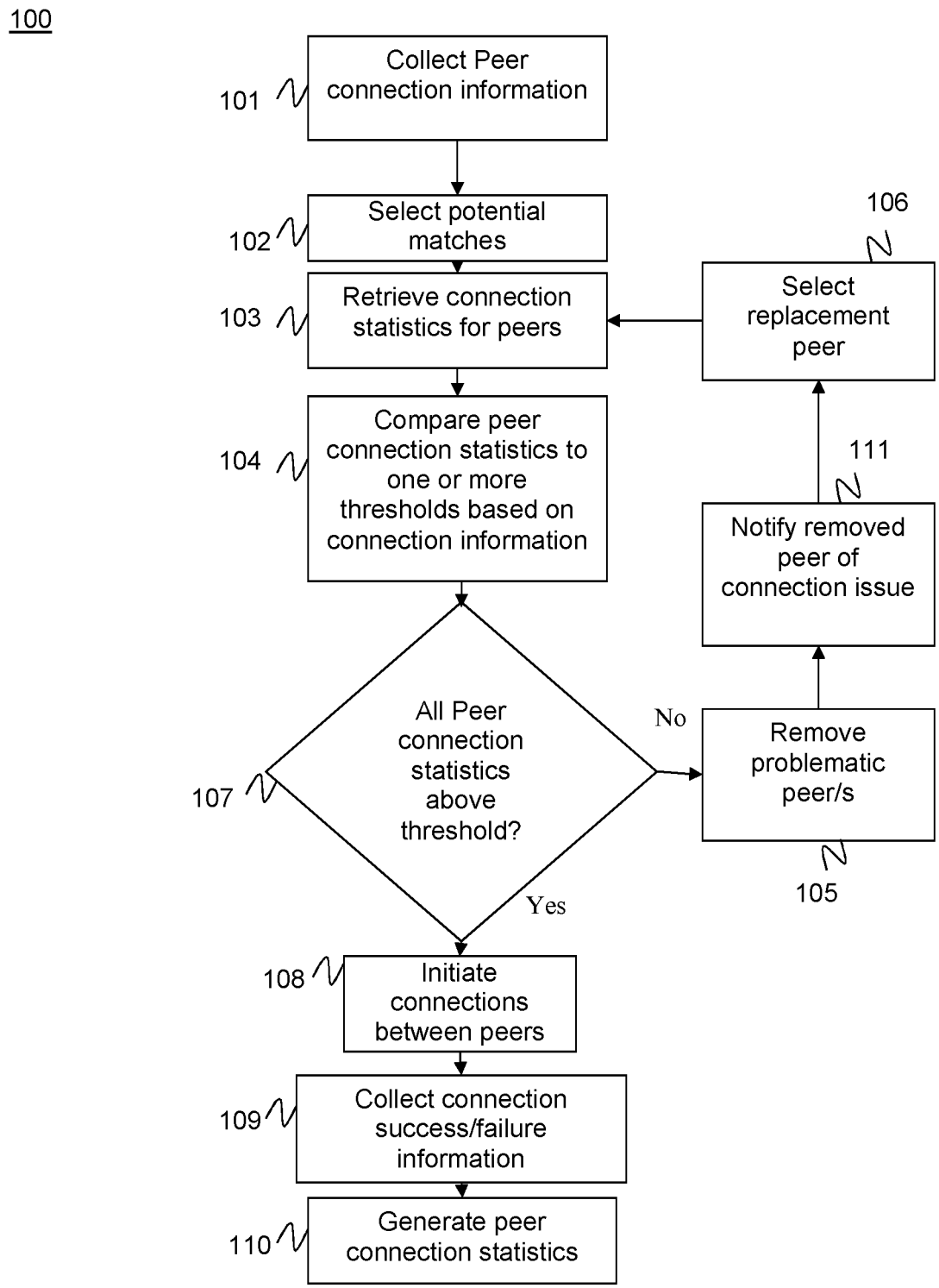
FIG. 1 is a flow diagram of a method for improved peer matchmaking on a matchmaking server having a connection statistics database according to an aspect of the present disclosure.

FIG. 1 shows a method 100 for enhanced matchmaking according to aspects of the present disclosure. As an initial step each device may register with the match making server as indicated at 101 to initiate the match making process. The devices may send network information to the matchmaking server to facilitate an improved connection matching process. The network information may include information such as game or application/service name as seen for example in TABLE 1, NAT type, UPnP availability, router brand, router model, router firmware version, network adapter settings, firewall type, firewall settings, external ip address, etc. According to some embodiments of the present disclosure the matchmaking server may use a device Media Access Control (MAC) address to determine router brand and model information. Additionally, the network information may include geographical network information. As used herein, the term geographical network information refers to locational information, such as intranet, extranet, campus network information. By way of example, and not by way of limitation some internet service providers (ISP) or networks, e.g., university networks, may prohibit P2P connections from outside the ISP or network for certain applications.

After registration with the matchmaking server a matchmaking process is initiated 102. Prior to the present disclosure match making servers would choose clients based information such as win rate or rank or queue position. Methods for collection and generation of player statistics which may be used for match making are described, e.g., in commonly owned U.S. Pat. No. 8,998,723, which is incorporated herein by reference.

A widely used match making algorithm is the Elo rating system. The Elo rating system ranks players based on wins losses and draws. Players lose or gain ratings based on their rating and the expected score of each match. Thus matching players by Elo rating is an appropriate way to generate fair and competitive teams.

According to embodiments of the present disclosure the matchmaking server may initially choose devices as potential peer to peer matches based on user statistics 102 such as user rank, win/loss ratio, community rating, Elo rating etc. Alternatively the matchmaking server may match devices based on an overall connection success rate associated with the device.

Match Refinement Process

Once a set of potential peer to peer matches has been selected the matchmaking server may begin the match refinement process. According to one embodiment of the present disclosure the matchmaking server may have a database of connection statistics for connections between peers of various hardware configurations. The database may be comprised of matched pairs of network information associated with a connection rate statistic as seen in TABLE 1. The connection rate statistic may be an average connection rate, an average connection failure rate, a percentage connection success rate, a percentage connection failure rate etc. There may also be additional information about the historical connections between the two network configurations for example the average time it takes to form a connection between the devices, the average connection length between the devices, etc. To assist in searching the database may be encoded with a hash-function.

TABLE 1

| Device 1 | Device 2 | Average connection success rate |
|---|---|---|
| Game X | Game X | 0.99 |
| Cone NAT | Cone NAT | |
| D-link router | TP-link | |
| AC1900 | Archer C1200 | |
| Firmware V 1.0 | Firmware V1.9 | |
| Firewall: No | Firewall: Yes | |
| None | Stateful | |

The matchmaking server may query the database to determine the connection statistics of each pair of devices in the set of potential peer to peer matches, as indicated at 103. Once connection statistics have been gathered for all devices in the set of potential peer to peer matches the connection statistics are compared to threshold values, as indicated at 104. By way of example and not by way of limitation the threshold values may be a single global threshold set by the matchmaking server, alternatively the thresholds may be determined by an application or game, or the thresholds may be determined experimentally or statistically based on hardware configurations or application type.

Devices may be removed from the set of potential peer to peer matches depending upon whether they satisfy a threshold condition, as indicated at 105. By way of example and not by way of limitation the threshold may be an average connection success rate threshold. In that case devices with connection statistics below the threshold would be removed. Alternatively the threshold may be average connection failure rate, in which case devices with connection statistics above the threshold would be removed. It should be understood that the threshold could be set for other values such as time to connect, latency, etc. Fault tolerance may further be embedded in the matchmaking method by allowing for a pre-determined amount of connection statistics of device pairs to fail to satisfy the threshold condition before removing the device. This pre-determined amount may be determined as a trade-off between matchmaking search time and connection failure rates. Alternatively the pre-determined amount may be decided experimentally on a global or per application basis.

TABLE 1 may include geographic network information as discussed above and such information may be used to determine devices for which outside P2P connections for the application are blacklisted by their ISP or network and will not be considered for matchmaking. This allows the application to perform P2P connection attempts smoothly and quickly, without wasting time on devices for which there is a high degree of confidence they will fail to connect with others. Such devices may also simultaneously be informed that their network or ISP is the most likely reason why they are unable to participate.

While the connection statistics for device pairs is disclosed it should be understood that the current disclosure is not so limited. Connection statistics may be expanded to represent connection statistics between networks or network providers or geographical areas. By way of example and not by way of limitation a University network may block a certain ports that are used for gaming due to security policy, a person trying to make a peer to peer connection from the University network would be able to connect to the matchmaking server but fail all peer to peer connections. In this case the system will determine that devices within the IP range of the University network all fail all peer to peer connections and remove the devices without determination of connection statistics on a device level.

It should be understood that within the connection statistics devices are represented by the collection of network components provided to the matchmaking server as network information. Connection statistics may be generalized to represent all devices that have similar or identical network configurations. Connection statistics may also be refined to a more granular level where rates of success or failure are represented on per component basis for each matched pairs or each individual device. In the granular case the connection success or failure rates on a per component basis may be averaged to determine an overall connection statistic for the device pair although other forms of statistical analysis such as variance, median or range may be used. In other embodiments the component level rates of success or failure may be weighted before averaging to generate an overall connection statistic for the device pair.

Component level statistics may be further refined by removing or de-valuing statistics that do not contribute to the success or failure of connections. Component level statistic predictions may be compared to the real success or failure outcomes. If the component level statistic predictions are found to not meet a certain threshold for accuracy of prediction then that component level statistic may be removed from consideration. By way of example and not by way of limitation, if it is found that router firmware connection statistics only have a 50% chance of accurately predicting connection success or failure the system will place 0 weight on router firmware version when determining the overall connection statistic.

The matchmaking server may be configured to notify 111 the devices of the reason for removal. By way of example and not by way of limitation the match making server may be configured to send a pop-up message to the device describing the reasons why the device was removed from the match. Alternatively the device may be configured to receive connection statistics and determine the reason it was removed from the potential match on its own by comparing the connections statistics to a threshold.

While a process for matchmaking refinement is disclosed above on the for peer to peer devices, it should be understood that it is not so limited. The peer to peer matchmaking refinement process may be used to determine matches between client devices, home servers and UDP servers. By way of example and not by limitation a UDP server may be construed as a type of peer; albeit one that is hosted in a datacenter or in the cloud. The current disclosure would apply just the same, whereby a device or devices that have problems connecting to the UDP server could have their connection statistics used by the matchmaking server to determine that this particular device or devices are problematic when trying to communicate with this particular UDP server.

Device Replacement

Once a device has been removed from the set of potential peer to peer matches at 105 the matchmaking server may select another device from the devices connected to, or registered with the matchmaking server, as indicated at 106. As before the devices may be selected according to a rank or rating based match-making algorithm such as Elo or on a matchmaking queue or some combination of the two.

After a replacement device is chosen at 106 the matchmaking server will begin the match refinement as discussed above. In this replacement case the connection rate statistics queried at 103 by the match-making server may be limited to connection statistics for matches between the replaced device and the other devices as it has already been determined that the connection statistics between the non-replaced devices meet the thresholds at 104. Alternatively the matchmaking server may recheck the connection statistics of all device pairs against one or more thresholds at 104 to ensure that there has been no change in the compatibility of the devices for peer to peer connections.

If it is determined that one or more devices do not meet one or more thresholds after replacements have been selected at 107, the process will repeat and the devices that have connection statistics that do not satisfy the threshold condition will be removed and replaced as described above. This process will continue until all connection statistics at least satisfy the threshold condition at 107. Alternatively the match maker may allow for a certain number of devices to have connection statistics that fail to satisfy the threshold condition before repeating the removal process at 107. By way of example and not by way of limitation, the match making server may allow for 4 devices to have a connection success rate below a threshold of 0.95 before repeating the removal and replacement process described above. This failure allowance could be a preset number or on a sliding scale that depends on the number of times the process has repeated. In this way the matchmaker could be arranged to trade match making time for likelihood of connection success. As an example the match maker could first be set to allow 2 connection statistics to be below a threshold before removing a device and replacing the device and after replacement the matchmaker could be set to allow 4 connection statistics to be below a threshold.

Initiating a Connection

According to aspects of the present disclosure the matchmaking server will initiate connections between the devices after the match refinement process has completed, as indicated at 108. To initiate a connection between devices at 108 the matchmaking server may send a message to each device to begin a connection process between the devices. The message sent to each device may include list of addresses and ports for each device that has been selected during the match making process described above, this list hereinafter will be referred to as the refined set of matched peers. This refined set of matched peers may be edited by the matchmaking server to exclude the address of the device that is receiving the list. Alternatively the device receiving the refined set of matched peers list may recognize its own address and ignore that address. Further aspects of peer to peer connection and NAT navigation are described in commonly owned U.S. Pat. No. 8,224,985, which is incorporated herein by reference.

In alternative embodiments of the present disclosure the match making server may begin a host selection process using the refined set of matched peers after the match refinement process has completed to initiate connections between the peers at 108. The matchmaking server may select a host and share the host information with the other peers. The host in a peer to peer scheme has special responsibilities and therefore the stability and compatibility of the host system with the peers is important. It may be advantageous for the matchmaking server to select the host based on connection statics. By way of example and not by way of limitation the matchmaking server may select the device with the highest connection success rate or lowest connection failure rate to be the host. Additional aspects of host selection are described in commonly owned U.S. Pat. No. 8,060,626 incorporated herein by reference.

Collecting Connection Success or Failure Information

According to an embodiment of the present disclosure the matchmaking server collects connection failure or success information from the devices, as indicated at 109. To collect the connection success or failure information the match making server may send a request to the devices for information about whether the connection peer to peer connections between the devices in the refined set of matched peers succeeded. Alternatively the request may be for whether a peer to peer connection failed. According to other embodiments of the present disclosure the devices may be configured to send a message to the match making server representing a success or alternatively a failure to connect to one or more of the peers at 109.

The connection success or failure information collected at 109 may simply be a signal or message representing whether a connection between a pair of peers succeeded or failed. Connection or failure information collected at 109 may be limited to a signal or message representing only a failure to connect or only a successful connection. For each connection made by each device there may be connection or failure information generated and sent to the match making server or a connections statistics database. Devices may also be configured to send additional information to the matchmaking server including network information as discussed above, the time it takes for each peer to connect, how many times the device has unexpectedly dropped a connection to a peer, the TCP/IP port the device was connection to, whether the connection was wired or wireless, Wireless connection information such as signal strength or interference, time of day, connection traceroute or latency information and the like. In particular tracerout information is useful to log the most likely connectivity path taken during the attempted connection to the peer, and possibly identify route related issues. Connection success or failure information need not be limited to a single application or hardware device. The matchmaking server or connection statistics database may collect connection success or failure information for all peer to peer connections made by devices in communication with the server or database.

Generating Statistics

After the connection failure or success information has been collected the matchmaking server may generate or update connection statistics associated with the devices involved in the connection failure or success information, as indicated at 110. The matchmaking server may also use the network information associated with the devices to define and further analyze the connection failure or success information. The match making server may generate an average success rate value or percentage by taking the number of successful connection attempts divided by the total number of connection attempts. Alternatively the server may generate an average failure rate by taking the number of failed attempts divided by the total number of connection attempts. This information may be matched to each device or each device pair according to network information. By way of example and not by way of limitation a device having a cone NAT with router X firmware 1.2 for their router and no firewall may have a 98% connection success rate with a device having a restricted NAT, with router Z firmware 0.5 and no firewall. This pair wise match could be represented as a single connection success statistic for the pair of devices and generalized to all devices with identical network information to the devices in the pair as seen in TABLE 2. The system could use the determined connection statistics for other pairs of devices having the same network information.

TABLE 2

| CLIENT 1 | CLIENT 2 | RESULT |
| --- | --- | --- |
| Account A<br>Cone NAT<br>X Firmware 1.2<br>No firewall | Account Q<br>Restricted NAT<br>Z Firmware 0.5<br>No Firewall | Success |
| Account B<br>Cone NAT<br>X Firmware 1.2<br>No firewall | Account R<br>Restricted NAT<br>Z Firmware 0.5<br>No Firewall | Success |
| Account A<br>Cone NAT<br>X Firmware 1.2<br>No firewall | Account S<br>Restricted NAT<br>Z Firmware 0.5<br>No Firewall | Success |
| Account C<br>Cone NAT<br>X Firmware 1.2<br>No firewall | Account Q<br>Restricted NAT<br>Z Firmware 0.5<br>No Firewall | Fail |
| Account D<br>Cone NAT<br>X Firmware 1.2<br>No firewall | Account Q<br>Restricted NAT<br>Z Firmware 0.5<br>No Firewall | Success |

Success Rate = 0.8

In other implementations, as can be seen in TABLE 3 below, a single connection success rate or single connection failure rate is computed for each unique set of network information. TABLE 4 shows an alternative representation of the connection statistics. In this embodiment each component of the network information is paired and associated with a connection statistic such as success rate.

TABLE 3

| CLIENT | RESULT |
| --- | --- |
| Cone NAT<br>X Firmware 1.2<br>No firewall | Success |
| Cone NAT<br>X Firmware 1.2<br>No firewall | Success |

TABLE 3-continued

| CLIENT | RESULT |
| --- | --- |
| Cone NAT<br>X Firmware 1.2<br>No firewall | Success |
| Cone NAT<br>X Firmware 1.2<br>No firewall | Success |
| Cone NAT<br>X Firmware 1.2<br>No firewall | Fail |

AVG Success rate = 0.8

TABLE 4 shows an alternative representation of the connection statistics. In this embodiment each component of the network information of a first client/peer is matched with the component of the network information of a second client/peer when they attempt a connection. These component pairs are then associated with a connection statistic such as success rate.

TABLE 4

| Component 1 | Component 2 | Result |
| --- | --- | --- |
| Cone NAT | Restricted NAT | Success |
| Cone NAT | Restricted NAT | Failure |
| Cone NAT | Restricted NAT | Success |
| Cone NAT | Restricted NAT | Success |
| Cone NAT | Restricted NAT | Success |

AVG Success Rate = 0.8

Alternatively as shown in TABLE 5 each network component for a for a client/peer may have a simple failure/success rate associated with it, without consideration for the differences in hardware of peers.

TABLE 5

| Component | Result |
| --- | --- |
| X Firmware 1.2 | Success |
| X Firmware 1.2 | Success |
| X Firmware 1.2 | Failure |
| X Firmware 1.2 | Success |
| X Firmware 1.2 | Success |

AVG Success rate = 0.8

TABLE 6 shows an embodiment of the present disclosure where each component of the network information has an associated connection statistic. In the disclosed embodiment the connection statistics are for each component for the network information for the device is averaged to create an overall connection success rate for the pair of devices.

TABLE 6

| Client 1 | Client 2 | Rate |
| --- | --- | --- |
| Cone NAT | Restricted NAT | 0.97 |
| X Firmware 1.2 | Z firmware 0.5 | 0.99 |
| No Firewall | No Firewall | 0.98 |
| Total | Total | 2.94 |

Success rate = 0.98

It should be the clear from the disclosed embodiments that the connection statistics are not limited to an average. The disclosed embodiments may use other statistics such as the median connection success or failure rate, the mode, the lowest connection statistic, the variance of statistics or any other statistical method to accurately model whether a client's attempt to form a connection with a peer will be successful.

Figure 2:
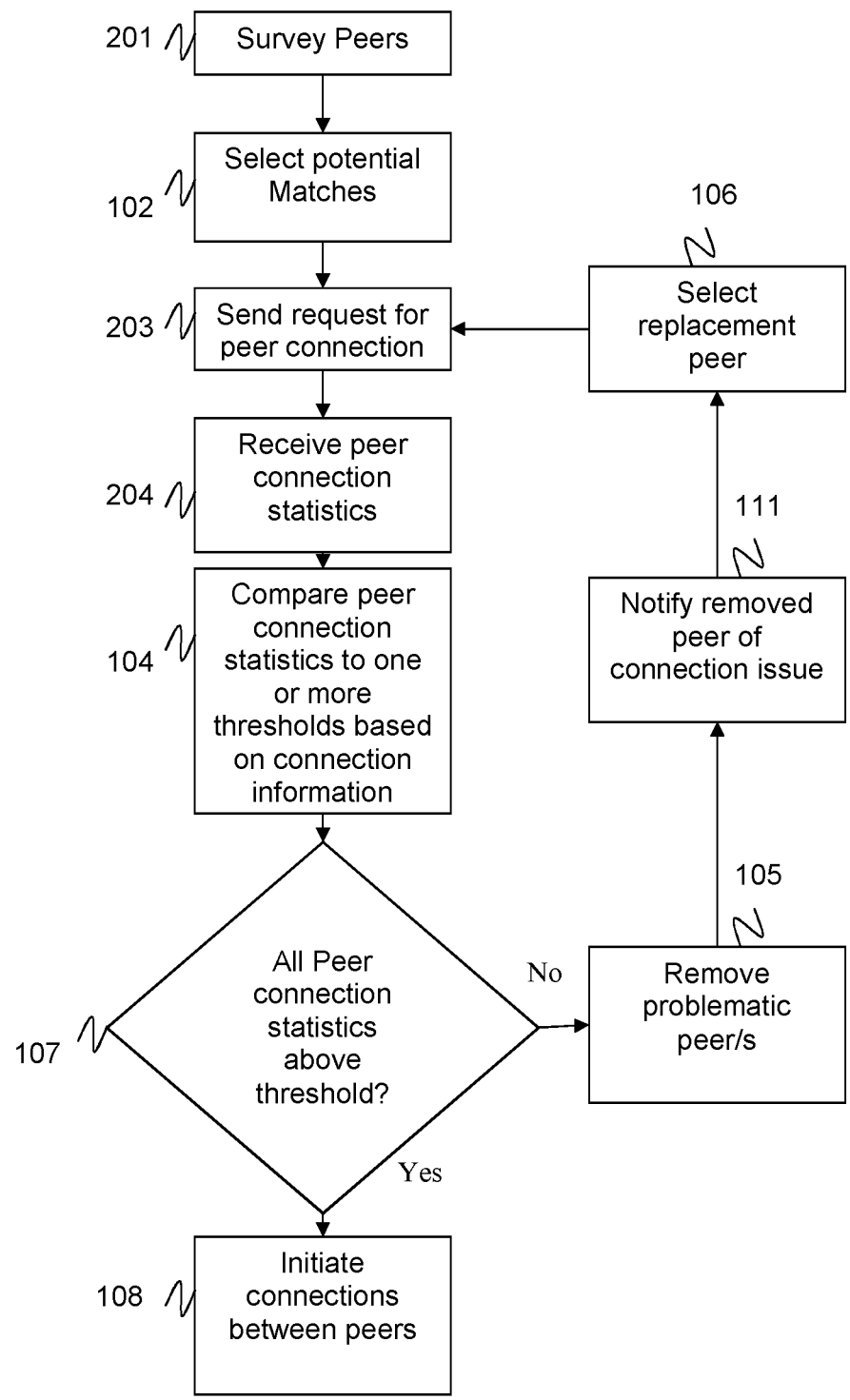
FIG. 2 is a flow diagram of a method for improved peer matchmaking on a matchmaking server with a separate statistics database server according to an aspect of the present disclosure.

In an alternative implementation illustrated in FIG. 2 the matchmaking server may act as a relay for a connection statistics database. In an alternative method 200 shown in FIG. 2, the matchmaking server may register devices and collect the network information, as indicated at 201. The matchmaking server would then send the network information to a server that handles the connection statistics database, as indicated at 203. The network information may also include information about the past successful and unsuccessful peer to peer connections made by the device. In any case the matchmaking server may send a request to the connection statistics server for statistical information 203 about a client or client pair and receive statistical information 204 from the connection statistics server. Other portions of the method 200 correspond to those of the method 100 of FIG. 1, as indicated by reference numerals common to both figures.

In alternative implementations, the connection statistics may be implemented on a separate database, which may be implemented by a separate server from the matching server. The separate server is referred to herein as a connection statistics server or statistics server to distinguish it from the matchmaking server. It is possible that the functions of both the statistics server and the matchmaking server may be implemented on the same computer system, however aspects of the present disclosure are not limited to such implementations.

Figure 3:
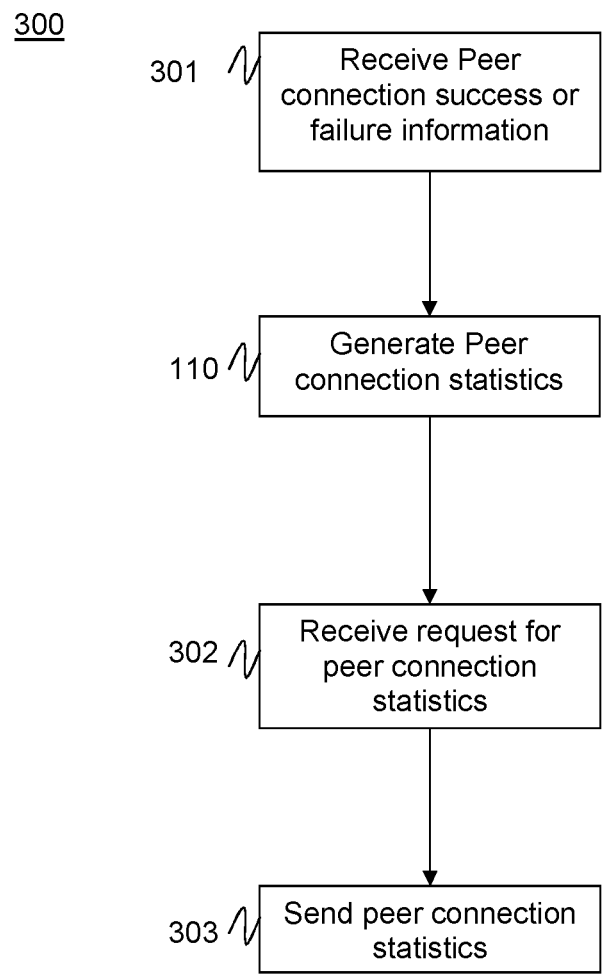
FIG. 3 is a flow diagram for collection and generation of peer statistics with a connection statistics database according to aspects of the present disclosure.

FIG. 3 depicts an example of a method 300 for obtaining the connection statistics with such a separate server. In this implementation each client device may register with both the matchmaking server and the statistics database. Alternatively the matchmaking server may send device network information to the connection statistics database or the database may request information from the matchmaking server.

Once a connection is initiated the devices may be configured to send a message to the database indicating whether the peer to peer connections succeeded, or failed. Alternatively the matchmaking server may receive connection or failure messages from the devices and relay those messages to the connection statistics database. However it is generated, the statistics server receives this peer connection success or failure information, as indicated at 301. As discussed above, the connection success or failure information collected at 301 may be a signal or message representing whether a connection between a pair of peers succeeded or failed. As in the above example, connection success or failure information need not be limited to a single application or hardware device. The matchmaking server or connection statistics database may collect connection success or failure information for all peer to peer connections made by devices in communication with the server or database.

Connection statistics associated with the devices involved in the connection failure or success information may be generated or updated in the manner described above, as indicated at 110. The statistics server may receive a request for peer connection statistics as indicated at 302, e.g., from a matchmaking server. Subsequently, the statistics server may reply to such a request by sending the requested statistics, as indicated at 303.

Embodiments of the disclosed connection statistics may be implemented by a matchmaking server with an integrated connection statistics database or alternatively the statistical analysis may be performed by a separate connection statistics server in communication with a matchmaking server that implements the method 100 of FIG. 1 or the method 200 of FIG. 2. The statistics server may be built upon existing peer to peer connection databases or may be developed by collecting peer to peer connection success or failure information for a training period before implementing the disclosed match refinement scheme. The statistics server receives information based on the attributes of various devices and the outcomes of their connection attempts. The depth of the attributes determines how advanced the query will be. A connection statistics dataset, once established can be used by multiple different applications, and may evolve over time as entries get aged out and re-tested to confirm their most recent values for connectivity success rates. The matchmaking server may also communicate connection success or failure information to the connection statistic server. Alternatively each peer device may be configured to report the connection success or failure information at 301 to the connection statistic server. In the case of peer devices configured to communicate success or failure information, connection statistics server may be configured to cull duplicate entries based on a time-stamp of when the connection was attempted.

Systems

Figure 4A:
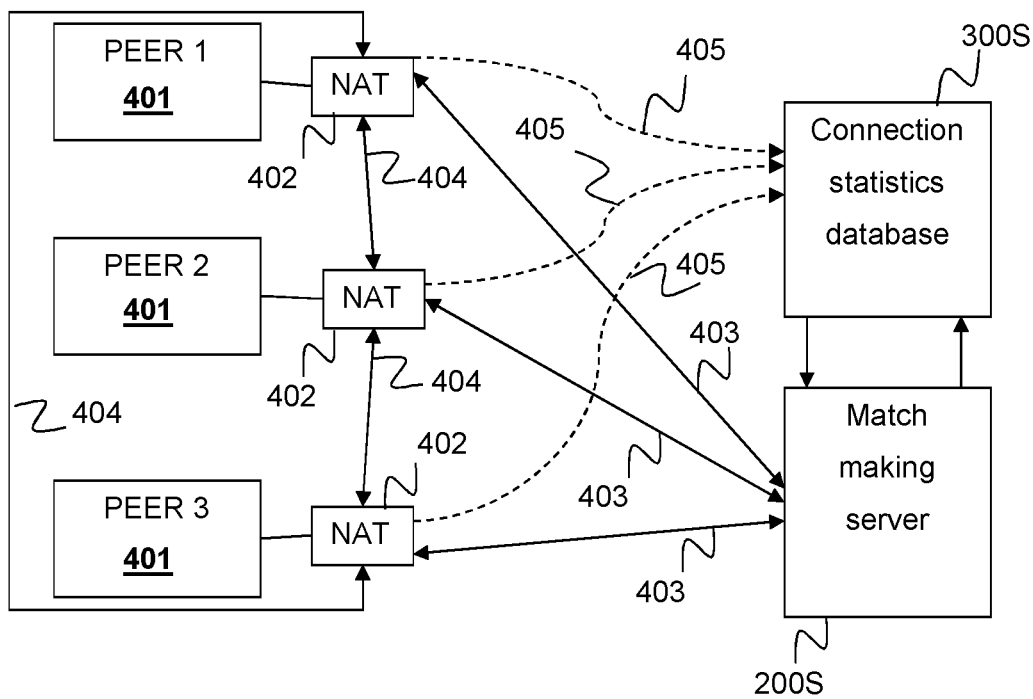
FIG. 4A is a block diagram of a peer to peer connection scheme with a matchmaking server and connection statistics database server according to aspects of the present disclosure.
Figure 4B:
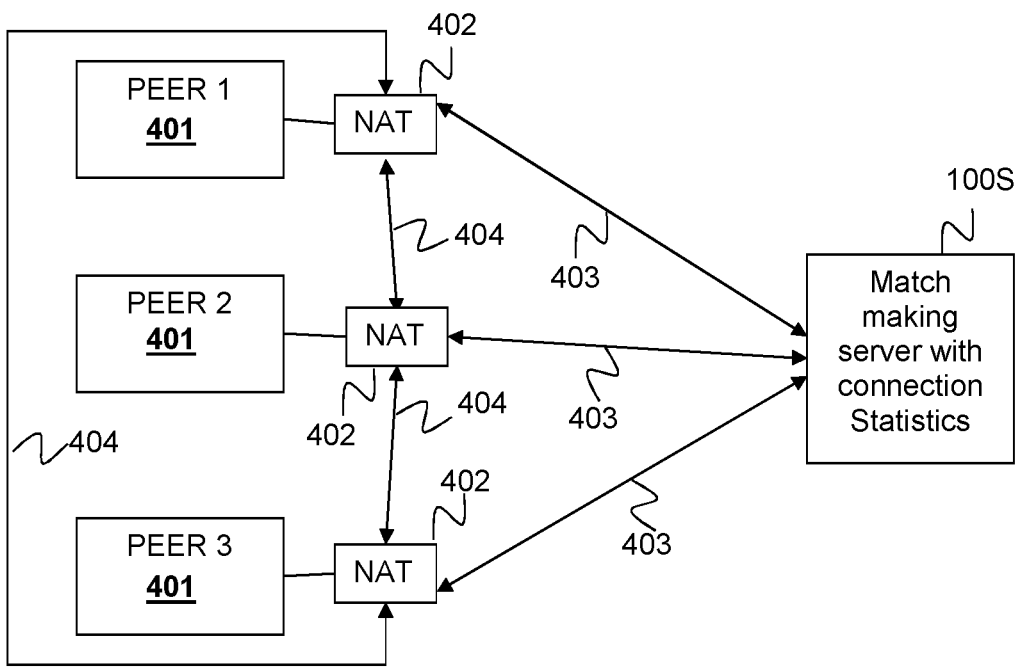
FIG. 4B is a block diagram of a peer to peer connection scheme with a matchmaking server according to aspects of the present disclosure.

FIGS. 4A and 4B show network configurations according to aspects of the present disclosure. FIG. 4A depicts an embodiment with separate matchmaking server 200S and connection statistics server 300S. Each of the peer devices 401 may be behind a router having or switch having a NAT 402. The peer devices are configured to from connections 403 to matchmaking server 200 and connect 405 the connection statistic server 300 through the NAT 402. The matchmaking server may initiate peer to peer connections 404 through the router and NAT 402. FIG. 4B depicts another embodiment where the connection statistic server and matchmaking server have been integrated into a single server 100S. Thus in FIG. 4B the peers only need to form connections 403 to the integrated statistics and matchmaking server 100S.

Figure 5:
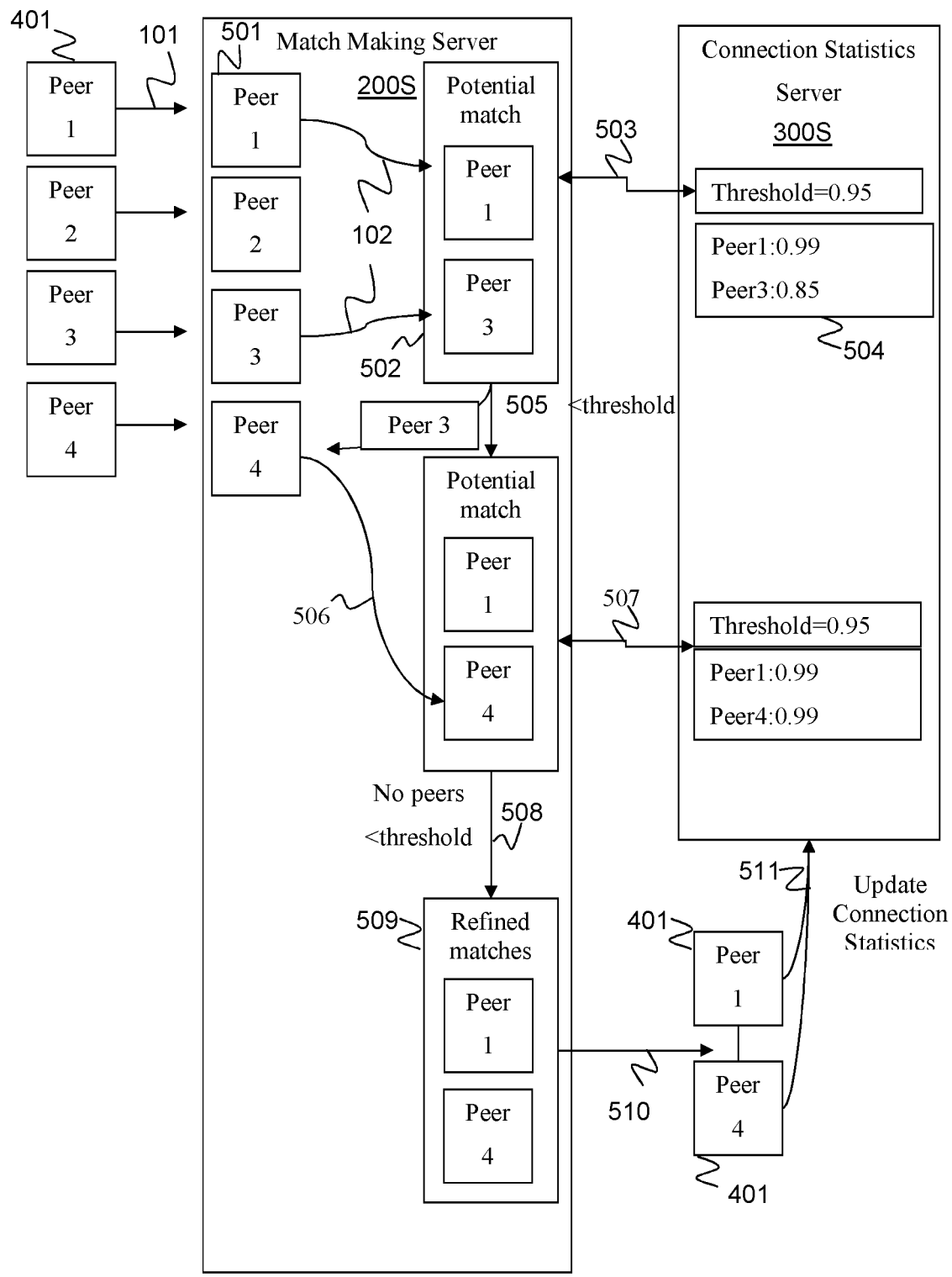
FIG. 5 is a block diagram showing the method for improved matchmaking as implemented by a matchmaking server according to an aspect of the present disclosure.

FIG. 5 depicts the coordinated operation of the matchmaking server and the connection statistics database according to an embodiment of the present disclosure. Each peer 401 may initially register or connect with the matchmaking server 200, as indicated at 101. The matchmaking server may maintain a list of active peers 501 which are peers currently connected or recently registered with the matchmaking server. The matchmaking server may initially match peers F based on a ranking or some other metric as discussed above. Once the matchmaking server as created a set of potential matches 502 it will begin the match refinement process. The match refinement process begins in this embodiment with the matchmaking server 200 sending the network information of the peers and a request for connection statistics 503 to the connection statistics server 300, the connection statistics server will query its database and send back the connection statistics 504 for each device pair in the set of potential matches 503. The matchmaker will compare the device statistics to the threshold and remove devices that are below the threshold 505. It should be noted that the matchmaking server may receive the threshold from the connection statistics server as depicted or the matchmaking server may have a threshold set on for instance a per application basis. The matchmaker may then select another peer 506 based on a ranking or metric as before and retrieve the connection statistics for the new pair 507. As before the matchmaking server will compare the connection statistics to a threshold 508. If all devices satisfy the condition associated with the threshold 508 then the match making server will initiate 510 a connection between set of refined matches 509. In this embodiment the peers 401 are configured to notify the connection statistic database of their connection success or failure information 511 after they have initiated a connection attempt 510. The connection statistics database will then generate and update the connection statistics 504 for based on the information received from the peers. Once peer to peer connections have been generated and connection success or failure information has been received the system will be ready to start the connection process again. It should be understood that multiple matchmaking processes as described may be occurring at once.

Figure 6:
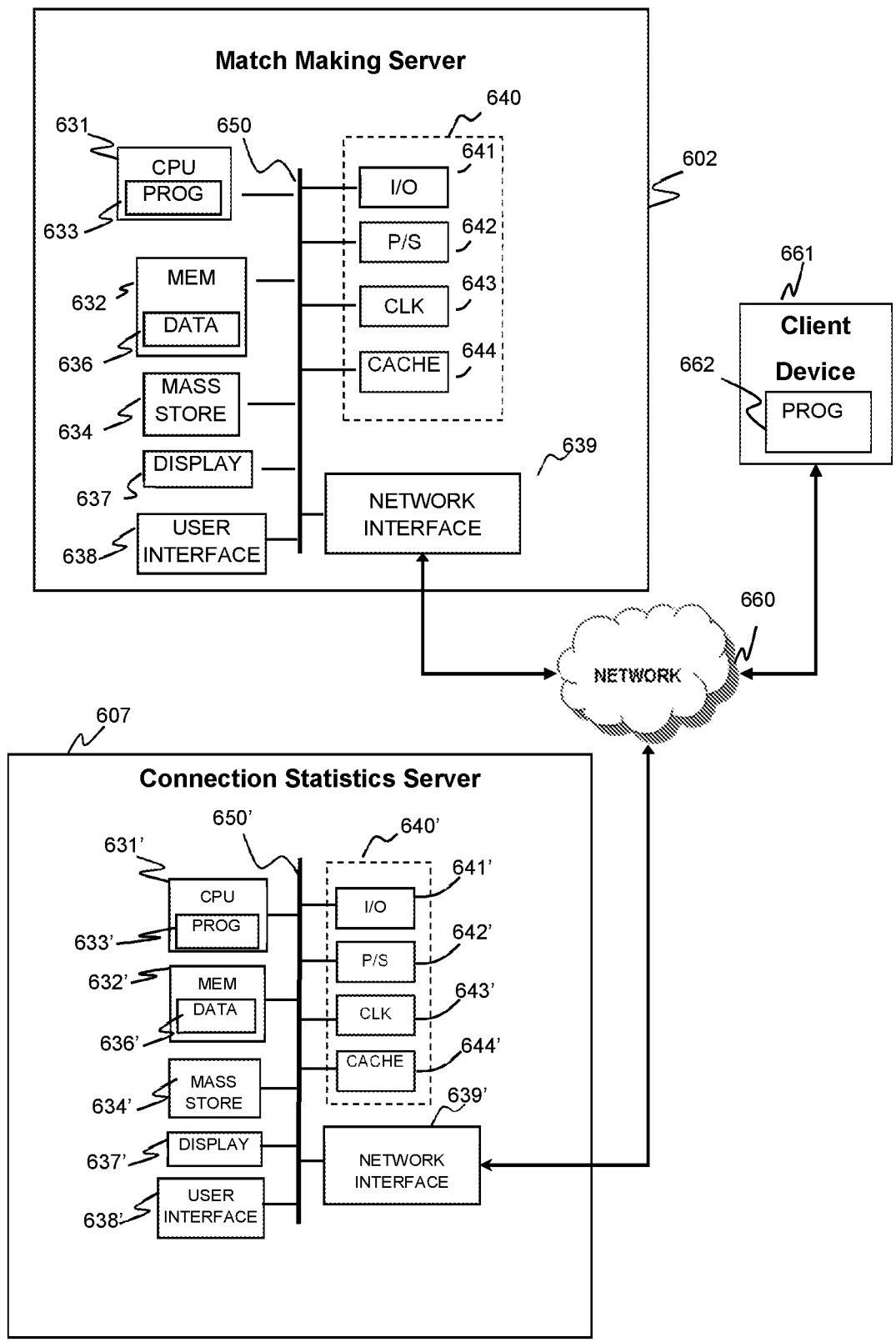
FIG. 6 is a block diagram illustrating implementation of a matchmaking server in conjunction with a connection statistics server and client device(s) according to aspects of the present disclosure.

The block diagram shown in FIG. 6 schematically illustrates certain details of aspects of the present disclosure within the particular context of matchmaking. In this example, a connection statistics server 607 may be accessed by a matchmaking server 602 over a network 660. The matchmaking server 602 may connect with multiple connection statistics server 607 over the network 660. Connection statistics servers 607 may be identical to each other, or they may each have a different connection statistic database.

Alternatively the matchmaking server 602 may have a connections statistics database stored in mass storage 634 or in memory 632. In this case the matchmaking server 602 CPU 631 would be programmed 633 to carry out connection statistics analysis and peer-to-peer matching, e.g., as described above with respect to method 100 of FIG. 1 or method 200 of FIG. 2. The program 633 may access a connection statistics database, which may be stored as data 636 in the memory 632 or in a mass storage device 634 or in some combination of both.

The matchmaking server 602 may include a central processor unit (CPU) 631. By way of example, a CPU 631 may include one or more processors, which may be configured according to, e.g., a dual-core, quad-core, multi-core, or Cell processor architecture. The matchmaking server 602 may also include a memory 632 (e.g., RAM, DRAM, ROM, and the like). The CPU 631 may execute a connection statistics analysis and peer-to-peer matching program 633, portions of which may be stored in the memory 632. The matchmaking server 602 may also include well-known support circuits 640, such as input/output (I/O) circuits 641, power supplies (P/S) 642, a clock (CLK) 643 and cache 644. The matchmaking server 602 may optionally include a mass storage device 634 such as a disk drive, CD-ROM drive, tape drive, or the like to store programs and/or data. The matchmaking server 602 may also optionally include a display unit 637 and a user interface unit 638 to facilitate interaction between the matchmaking server 602 and a user who requires direct access to the matchmaking server 602. The display unit 437 may be in the form of a cathode ray tube (CRT) or flat panel screen that displays text, numerals, or graphical symbols. The user interface unit 638 may include a keyboard, mouse, joystick, light pen, or other device. The matchmaking server 602 may include a network interface 639, configured to enable the use of Wi-Fi, an Ethernet port, or other communication methods. The matchmaking server 602 may be configured to carry out the improved matchmaking method according to aspects of the present disclosure, the method may be embodied in a computer readable medium contained within the mass storage device 634 or embodied in memory 632 or a cache 644.

The network interface 639 may incorporate suitable hardware, software, firmware or some combination of two or more of these to facilitate communication via an electronic communications network 660. The network interface 639 may be configured to implement wired or wireless communication over local area networks and wide area networks such as the Internet. The matchmaking server 602 may send and receive data and/or requests for files via one or more data packets including network information over the network 660 from client devices 661 or the connection statistics server 607. The matchmaking server 602 is configured to connect with one or more client device/s 661. The matchmaking making server 602 according to embodiments of the present disclosure is configured to facilitate peer to peer connections between client devices 661. The client devices may run a matchmaking program 662 to facilitate connections between peers 661 and the matchmaking server 602.

The matchmaking server 602 may be a general purpose computer that becomes a special purpose computer when running code that implements embodiments of the present invention as described herein.

The connection statistics server 607 may include a central processor unit (CPU) 631'. By way of example, a CPU 631' may include one or more processors, which may be configured according to, e.g., a dual-core, quad-core, multi-core, or Cell processor architecture. The connection statistics server 607 may also include a memory 632' (e.g., RAM, DRAM, ROM, and the like). The CPU 631' may execute a connection statistics generation program 633', portions of which may be stored in the memory 632'. The program 633' may generate and/or update connection statistics in a connection statistics database, which may be stored in memory 632' as data 636'. Alternatively, some or all of the connection statistics database may be stored in a mass storage device 634'. In other implementations connection statistics database may be stored partly in the memory 632' and partly in the mass storage device 634'.

The connection statistics server 607 may also include well-known support circuits 640', such as input/output (I/O) circuits 641', power supplies (P/S) 642', a clock (CLK) 643' and cache 644'. The connection statistics server 607 may optionally include a mass storage device 634' such as a disk drive, CD-ROM drive, tape drive, or the like to store programs and/or data. The mass storage device 634' or memory 632' may have embodied therein connection statistics information for client devices 661. The connection statistics server 607 is also configured to perform analysis of connection success or failure information received from client devices 661 to generate connection statistics according to a program that may be embodied in memory 632' or in the mass storage 634'. The connection statistics server 607 may also optionally include a display device 637' and user interface unit 638' to facilitate interaction between the connection statistics server 607 and a user who requires direct access to the connection statistics server 607. The display device 637' may be in the form of a cathode ray tube (CRT) or flat panel screen that displays text, numerals, or graphical symbols. The user interface unit 638' may include a keyboard, mouse, joystick, light pen, or other device. The connection statistics server 607 may include a network interface 639', configured to enable the use of Wi-Fi, an Ethernet port, or other communication methods.

The network interface 639' may incorporate suitable hardware, software, firmware or some combination of two or more of these to facilitate communication via the electronic communications network 660. The network interface 639' may be configured to implement wired or wireless communication over local area networks and wide area networks such as the Internet. The connection statistics server 607 may send and receive data and/or requests for files via one or more data packets including connection success or failure information over the network 660 from the matchmaking server 602 or client devices 661. The connection statistics server 607 may be configured to connect with one or more client device/s 661. The matchmaking making server 602 according to embodiments of the present disclosure is configured to collect connection information from client devices 661. The client devices may run a matchmaking program 662 to facilitate sharing information with the connection statistics server 607.

The connection statistics server 607 may be a general purpose computer that becomes a special purpose computer when running code that implements embodiments of the present invention as described herein.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for improved peer to peer matchmaking, the method comprising:
   a) obtaining network information from a plurality of devices;
   b) selecting a plurality of users to form peer to peer connections via a corresponding plurality of devices to create a set of potential matches;
   c) retrieving device connection statistics for each pair of devices in the set of potential matches;
   d) comparing device connection statistics to one or more threshold values;
   e) removing from the set of potential matches, users with devices that have at least one connection statistic that does not satisfy a threshold condition for that connection statistic as determined from said comparing the device connection statistics to the one or more threshold values;
   f) selecting replacement devices for the devices removed in step e) wherein the replacement devices were not part of the set of potential matches;
   g) initiating peer to peer connections among selected peers in a resulting refined set of matched peers.

2. The method of claim 1 further comprising repeating steps c) through f) until all of the device connection statistics satisfy all threshold conditions associated with the one or more threshold values to generate the refined set of matched peers before initiating peer to peer connections.

3. The method from claim 2 wherein updating peer device connection statistics in i) comprises generating average success or failure rates for individual network components of the devices in the refined set of match peers.

4. The method from claim 1 further comprising, h) collecting peer to peer connection success or failure information; and
   i) updating peer device connection statistics with the peer to peer connection success or failure information and network information of the one or more devices in the refined set of matched peers.

5. The method from claim 1 wherein selecting a plurality of users to form peer to peer connections via a plurality of devices in b) comprises matching users based on a matchmaking algorithm.

6. The method from claim 1 wherein network information includes NAT type.

7. The method from claim 1 wherein network information includes router type.

8. The method from claim 1 wherein network information includes Firewall type or Firewall settings.

9. The method from claim 1 wherein connection statistics comprises historical connection information of connections between devices having identical specifications to the devices chosen as potential peer to peer matches.

10. The method from claim 9 wherein the historical connection information is an average connection success rate.

11. The method from claim 7 wherein the historical connection information is an average failure rate.

12. The method from claim 1 where in satisfying the threshold condition in e) further comprises meeting or exceeding a threshold value.

13. The method from claim 1 wherein satisfying the threshold condition in e) comprises being at or below a threshold value.

14. The method of claim 1 wherein removing the devices at e) further comprises sending a message to the device notifying a user of connection issues.

15. The method from claim 1 wherein selecting potential peer to peer matches in b) comprises matching devices based on an overall connection success or failure rate for each device.

16. The method from claim 1 wherein the one or more threshold values are dependent upon an application type.

17. The method from claim 1 wherein the one or more threshold values are dependent on a hardware configuration.

18. The method from claim 1 wherein at f) devices are removed only if a pre-determined number of connection statistics fail to satisfy the one or more threshold condition for those connection statistic as determined from said comparing the device connection statistics to the one or more threshold values.

19. The method from claim 1 wherein the network information includes internet service provider or geographical computer network information.

20. A method for improved peer to peer matchmaking, the method comprising:
   a) obtaining network information from one or more devices;
   b) selecting a plurality of users to form peer to peer connections via a corresponding plurality of devices to create a set of potential matches;
   c) sending the network information of the set of potential matches to a connection statistics database;
   d) receiving connection statistics for each pair of devices in the set of potential matches;
   e) comparing connection statistics the to one or more threshold values;
   f) removing from the set of potential matches, users with devices that have at least at least one connection statistic that does not satisfy a threshold condition for that connection statistic as determined from said comparing the device connection statistics to the one or more threshold values;

g) selecting replacement devices for the devices removed in step f), wherein the replacement devices were not part of the set of potential matches;

h) initiating peer to peer connections among selected peers in a resulting refined set of matched peers.

21. The method of claim 20 further comprising repeating steps c) through h) until all of the peer device connection statistics satisfy all threshold conditions associated with the one or more threshold values to generate the refined set of matched peers before initiating peer to peer connections.

22. The method from claim 20 wherein selecting a plurality of users to form peer to peer connections via a plurality of devices in b) comprises matching users based on a matchmaking algorithm.

23. The method from claim 20 further comprising i) sending a request to the devices in the refined set of matched peers for connection success or failure information and j) receiving connection or failure information from at least one device in the refined set of matched peers.

24. The method from claim 23 further comprising k) sending the connection success or failure information to the connection statistics database.

25. A method for improved peer to peer matchmaking, the method comprising:
   a) obtaining network information for devices in a set of potential matches;
   b) generating connection statistics based on the network information and connection success or failure information;
   c) receiving a request for connection statistics for devices in the set of potential matches;
   d) sending the connection statistics for the devices in the set if potential matches;
   e) receiving peer to peer connection success or failure information for devices in a refined set of matched peers;
   f) updating the connection statistics with the peer to peer connection success or failure information and network information of the devices selected in the refined set of matched peers.

26. A non-transitory computer readable medium having embodied therein a computer readable instructions configured to implement a method for improved peer to peer matchmaking, the method comprising:
   a) obtaining network information from a plurality of devices;
   b) selecting a plurality of users to form peer to peer connections via a corresponding plurality of devices to create a set of potential matches;
   c) retrieving device connection statistics for each pair of devices in the set of potential matches;
   d) comparing device connection statistics to one or more threshold values;
   e) removing from the set of potential matches, users with devices that have at least one connection statistic that does not satisfy a threshold condition for that connection statistic as determined from said comparing the device connection statistics to the one or more threshold values;
   f) selecting replacement devices for the devices removed in step e), wherein the replacement devices were not part of the set of potential matches;
   g) initiating peer to peer connections among selected peers in a resulting refined set of matched peers.

27. The method of claim 26 further comprises repeating steps c) through f) until all of the device connection statistics satisfy all conditions associated with the one or more threshold values to generate the refined set of matched peers before initiating peer to peer connections.

28. The method from claim 26 further comprising, h) collecting peer to peer connection success or failure information; and
   i) updating peer device connection statistics with the peer to peer connection success or failure information and network information of the one or more devices in the refined set of matched peers.

29. A system comprising
   a processor;
   a memory coupled to the processor, wherein the memory contains executable instructions configured to implement a method for improved peer to peer matchmaking, the method comprising:
   a) obtaining network information from a plurality of devices;
   b) selecting a plurality of users to form peer to peer connections via a corresponding plurality of devices to create a set of potential matches;
   c) retrieving device connection statistics for each pair of devices in the set of potential matches;
   d) comparing device connection statistics to one or more threshold values;
   e) removing from the set of potential matches, users with devices that have at least one connection statistic that does not satisfy a threshold condition for that connection statistic as determined from said comparing the device connection statistics to the one or more threshold values;
   f) selecting replacement devices for the devices removed in step e), wherein the replacement devices were not part of the set of potential matches;
   g) initiating peer to peer connections among selected peers in a resulting refined set of matched peers.

30. The method from claim 29 further comprising repeating steps c) through f) until all of the device connection statistics satisfy all conditions associated with the one or more threshold values to generate the refined set of matched peers before initiating peer to peer connections.

* * * * *